United States Patent
Pepito

(10) Patent No.: US 9,527,549 B2
(45) Date of Patent: Dec. 27, 2016

(54) CLEAT-PEDAL ATTACHMENT SYSTEM

(71) Applicant: Allan M Pepito, Belmont, CA (US)

(72) Inventor: Allan M Pepito, Belmont, CA (US)

( * ) Notice: Subject to any disclaimer, the term of this patent is extended or adjusted under 35 U.S.C. 154(b) by 0 days.

(21) Appl. No.: 14/690,336

(22) Filed: Apr. 17, 2015

(65) Prior Publication Data

US 2016/0304156 A1    Oct. 20, 2016

(51) Int. Cl.
*B62M 3/00* (2006.01)
*B62M 3/08* (2006.01)

(52) U.S. Cl.
CPC ..................................... *B62M 3/086* (2013.01)

(58) Field of Classification Search
CPC ............. B62M 3/08; B62M 3/086; A43B 5/14
USPC ........................................................ 74/564.6
See application file for complete search history.

(56) References Cited

U.S. PATENT DOCUMENTS

| | | | |
|---|---|---|---|
| 4,803,894 A * | 2/1989 | Howell | A43B 5/14 36/131 |
| 4,827,797 A * | 5/1989 | Le Faou | B62M 3/086 36/131 |
| 5,704,256 A | 1/1998 | De Lattre | |
| 6,216,558 B1 | 4/2001 | Marui | |
| 7,430,941 B2 | 10/2008 | Muraoka | |
| 8,720,305 B1 | 5/2014 | Inoue | |
| 2013/0269477 A1 | 10/2013 | Williams | |

FOREIGN PATENT DOCUMENTS

| | | | | |
|---|---|---|---|---|
| FR | 2598996 A2 * | 11/1987 | ............ | B62M 3/086 |
| FR | 2624470 A1 * | 6/1989 | ............... | A43B 5/14 |
| FR | 2726744 A1 * | 5/1996 | ........... | A43B 1/0054 |

* cited by examiner

*Primary Examiner* — Vicky Johnson
(74) *Attorney, Agent, or Firm* — Shalini Venkatesh

(57) ABSTRACT

A cleat-pedal attachment system includes a cleat, comprising first and second surfaces, and a pedal. The pedal comprises a spindle, configured to reversibly attach to a crank arm of a bicycle, and a pedal frame. The pedal frame comprises a third surface positioned near the side of the pedal frame furthest from the crank arm, and a fourth surface, substantially perpendicular to the spindle axis, positioned near the side of the pedal frame closest to the crank arm. The first and third surfaces are shaped and oriented so that if the first surface is placed in direct contact with the third surface, a vertical force applied to the cleat in an upwards direction away from the pedal frame causes the second surface of the cleat to exert a horizontal force against the fourth surface of the pedal frame, maintaining the relative positions of the cleat and the pedal.

16 Claims, 6 Drawing Sheets

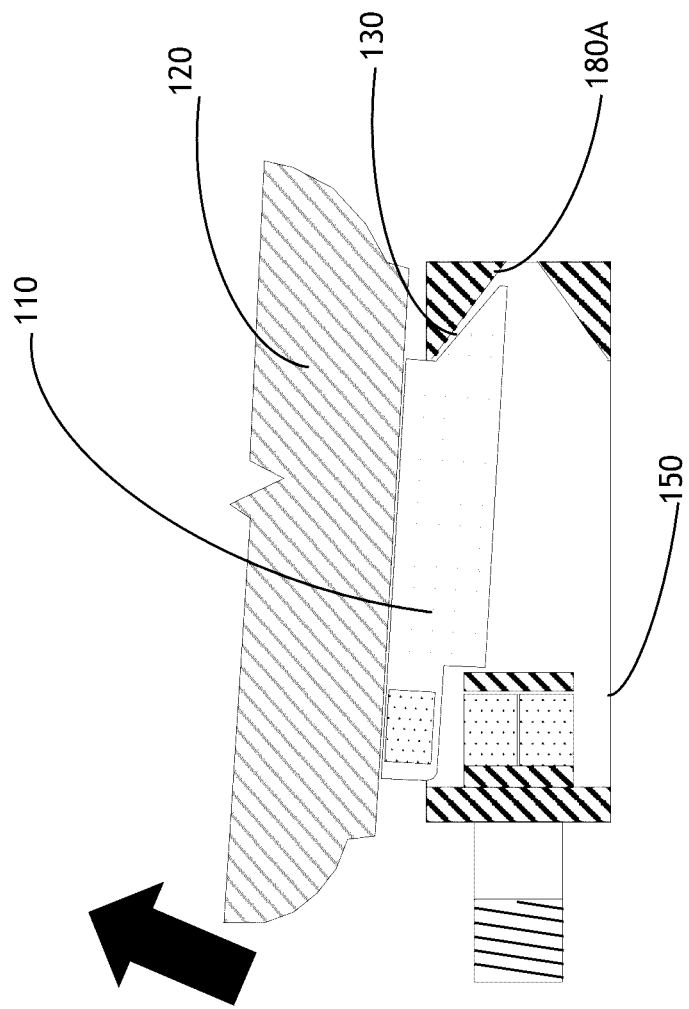
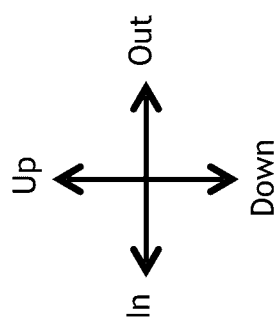
Figure 6

CLEAT-PEDAL ATTACHMENT SYSTEM

BACKGROUND

Various cleat-pedal attachment systems have been developed for bicyclists with the purpose of providing secure and accurate shoe placement for efficient pedaling. These systems, sometimes called "clipless", use a cleat with an upper portion that is attached to the underside of the sole of the cyclist's shoe and a lower portion that can be fitted securely into a target position on the pedal. It is desirable that a clipless system also allows the cleat to be easy disengaged from the pedal, whenever the user dismounts from the bicycle in a controlled fashion, but also in the case of a fall.

However, currently available designs require the cyclist to carry out specific, rather awkward, motions of the foot and ankle both to achieve accurate cleat placement on the pedal and to allow the cleat to disengage from the pedal. In many cases, engagement requires careful angular positioning of the foot about a vertical axis (an axis that is perpendicular to the pedal spindle axis, as explained further in the Detailed Description section below), to orient the foot correctly in a plane parallel to the pedal before or while lowering the foot into place. Mechanical forces, provided by torsional elements like springs, are typically used to keep the cleat in place during cycling. In some cases, guidance to the pedal and secure placement at the pedal may be achieved at least in part with the use of magnetic materials. Disengagement then involves either pulling the foot upwards with sufficient force to overcome the attractive mechanical and/or magnetic forces directly, or twisting the foot about a vertical axis, keeping the foot in a plane parallel to the pedal, to achieve a position at which those securing forces can again be overcome. These motions are not easy to perform, especially in a hurry, as the force required for the vertical pull must be significantly greater than the vertical forces exerted during normal pedaling, and the foot twisting process is an awkward one, not well suited to the natural anatomy and kinetics of the foot, ankle, and leg. Other drawbacks with current systems include the use of moving parts, like pivoting latches or springs, which may be adversely affected by exposure to mud, water etc and are prone to wear.

It is therefore desirable to provide a clipless cleat-pedal attachment (and detachment) system that requires relatively simple and natural motions of the foot and ankle, without the exertion of undue force. Ideally, the system would be free of any moving parts.

SUMMARY

The present invention includes a cleat-pedal attachment system. The system comprises a cleat, comprising first and second surfaces, and a pedal. The pedal comprises a spindle, configured to reversibly attach to a crank arm of a bicycle, and a pedal frame, comprising a third surface positioned near the side of the pedal frame furthest from the crank arm when the spindle is attached to the crank arm, and a fourth surface, substantially perpendicular to the spindle axis, positioned near the side of the pedal frame closest to the crank arm when the spindle is attached to the crank arm. The first and third surfaces are conformally shaped and oriented so that if the cleat is positioned in relation to the pedal such that the first surface is placed in direct contact with the third surface, a vertical force applied to the cleat in an upwards direction away from the pedal frame causes the second surface of the cleat to exert a horizontal force against the fourth surface of the pedal frame, maintaining the relative positions of the cleat and the pedal.

In one aspect, the first surface of the cleat comprises an upward-facing angled wedge surface and the third surface comprises a corresponding downward facing angled wedge surface.

In one aspect, the system additionally comprises a first plurality of magnets attached to or embedded within the cleat and a corresponding second plurality of magnets attached to or embedded within the pedal frame.

BRIEF DESCRIPTION OF THE DRAWINGS

FIG. 6 shows a cross sectional view illustrating a detachment method for a cleat-pedal system according to one embodiment.

DETAILED DESCRIPTION

Figure 1:
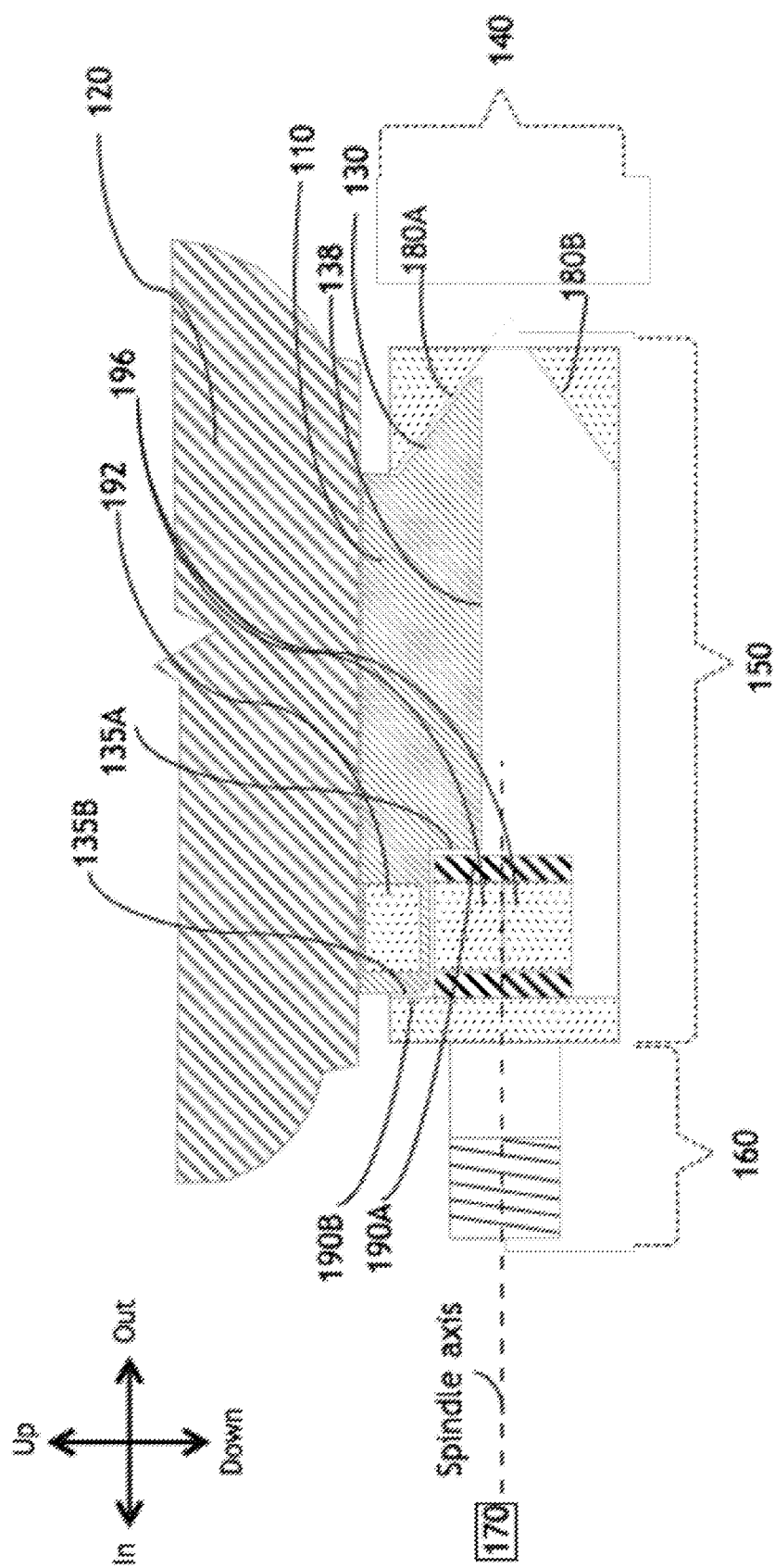
FIG. 1 illustrates the basic elements of a cleat-pedal system according to one embodiment.

The manner in which the present invention provides its advantages can be more easily understood with reference to FIGS. 1 through 6. Throughout this disclosure, "vertical" and "horizontal" have their standard meanings, and although a pedal can rotate around its spindle axis, un-less stated otherwise it is assumed that the pedal is oriented substantially horizontally. The term "outwards" refers to lateral directions away from the central vertical plane of the bicycle when a cyclist is seated in a normal riding position, "inwards" refers to lateral directions towards that central plane. The term "forwards" refers to the direction towards the bicycle handlebars; the term "backwards" refers to the direction towards the rear wheel of the bicycle. The central vertical plane of the bicycle is not shown explicitly in the figures, but its position may be readily inferred. In FIG. 1, for example, the central vertical plane would be orthogonal to the plane of the figure, positioned to the left of the elements shown, and including a vertical axis parallel to that shown as the "Up-Down" axis in the figure.

FIG. 1 illustrates the basic elements of a cleat-pedal system according to one embodiment, in which cleat 110, attached (typically with screws, not shown) to shoe 120, is shaped to include a protruding feature at its outer edge—outer meaning the edge close to the outside, lateral edge of the foot—with surface 130 that is angled relative to the base of the cleat, facing upwards and outwards relative to the plane of that base when the cleat is close to horizontal as shown.

Cleat 110 also includes substantially vertical surfaces 135A and 135B. In some embodiments, only a single vertical surface rather than two may suffice, as long as that surface is centered with respect to the spindle axis, meaning that the surface must extend in the forwards direction relative to the spindle axis to the same extent that it extends in the backwards direction relative to the spindle axis when the cleat is attached to the pedal. Cleat 110 also includes downward facing base surface 138.

Pedal 140 includes pedal frame 150 and spindle 160. Spindle 160 is configured to reversibly attach to a bicycle crank arm 170 (indicated schematically as a rectangle, for simplicity) along the spindle axis. Pedal frame 150 includes an inward facing surface 180A, shaped and angled to conform exactly to surface 130 of cleat 110 when the cleat and pedal frame are attached as shown. If a shape other than a simple wedge is used for cleat surface 130 as described above, the shape of surface 180A would also change in a corresponding, complementary way. Surface 180A is positioned near the side of pedal frame 150 furthest from crank arm 170 when spindle 160 is attached to crank arm 170. Pedal frame 150 also includes substantially vertical surfaces 190A and 190B, positioned near the side of pedal frame 150 closest to crank arm 170 when spindle 160 is attached to crank arm 170, and shaped to conform to surfaces 135A and 135B respectively when the cleat and pedal are in the locked or attached position shown. In embodiments where only a single vertical surface is present in cleat 110, only a single corresponding vertical surface is required in pedal frame 150.

The shape and orientation of surfaces 130, 135A, 135B, 180A, 190A and 190B are designed such that during normal pedaling, when a vertical force is applied to the cleat (upwards from the plane of the pedal as shown, perpendicular to the spindle axis) tending to pull the cleat away from the pedal, the forces produced between surfaces 130 and 180A will result instead in an inwards lateral push, parallel to the spindle axis and toward bicycle crank arm 170. However, pedal frame 150 offers no room for the cleat to slide horizontally along this direction, and surfaces 135A and 135B of the cleat will instead press against surfaces 190A and 190B of pedal frame 150, where frictional forces will tend to keep the cleat firmly down, in the desired pedaling position.

In the embodiment shown in FIG. 1, the protruding cleat feature has a simple wedge cross-section, but other shapes for the protruding feature may be used in other embodiments as long as the same results in terms of positional guidance, secure attachment, and translation of an upwards vertical pull to an inwards horizontal push as described above can be achieved.

In some embodiments, pedal frame 150 is dual-sided, or symmetric, in the sense that it may be turned upside down and still allow the cleat to lock into place as desired, just as in the "normal" orientation shown. FIG. 1 shows one such embodiment, where surface 180B is present within pedal frame 150, allowing the wedge of cleat 130 to press surface 130 against surface 180B when pedal frame 150 is turned upside-down relative to the illustrated orientation. Surfaces 135A and 135B would again experience horizontal forces against corresponding vertical surfaces (not explicitly labeled in the figure, for simplicity) near the inner side of pedal frame 150.

Figure 5:
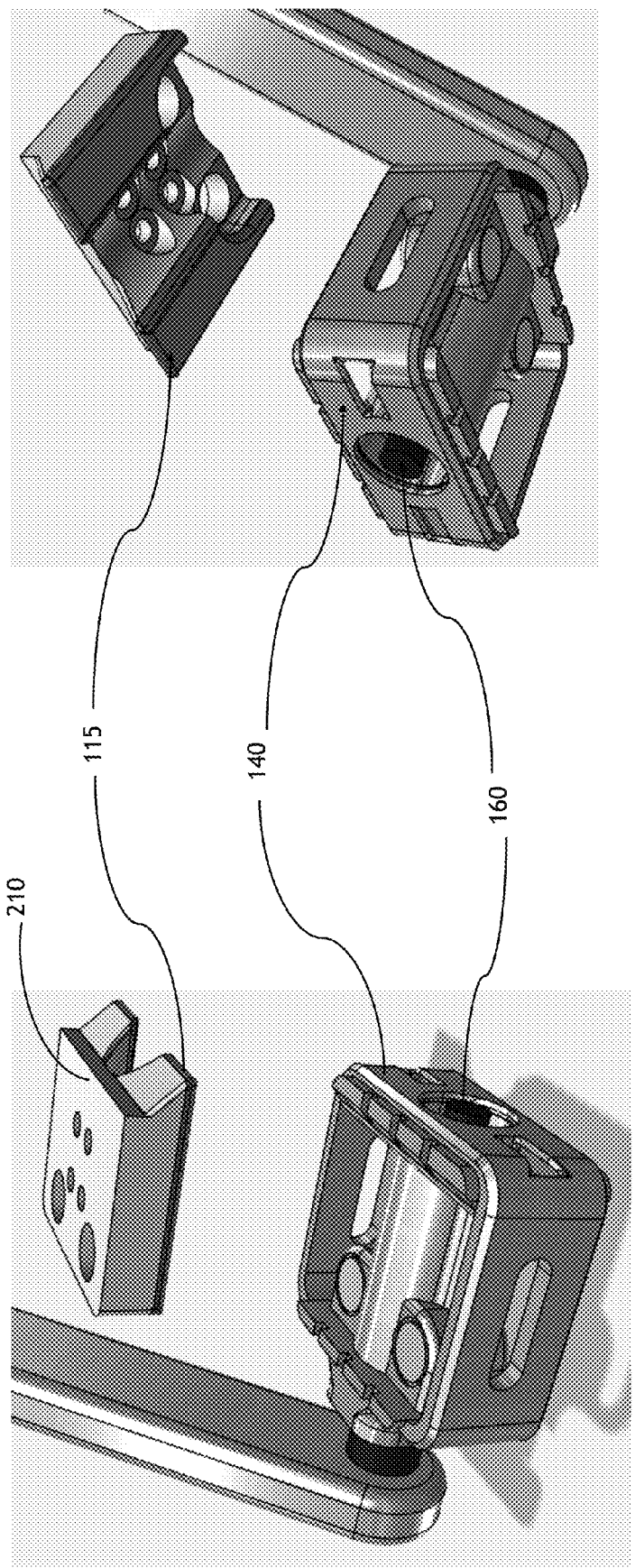
FIG. 5 shows exploded perspective views of a cleat-pedal system according to one embodiment.

In some embodiments, cleat 110 may include a plurality of magnets 192, at least one magnet being present forwards of the spindle axis, and at least one magnet being present on the opposite side of the spindle axis, closer to the back of the bicycle. Pedal frame 150 may include a corresponding plurality of magnets 196, at least one magnet positioned forwards of the spindle axis and one positioned backwards of the spindle axis. The magnets may be attached to the cleat and pedal frame respectively, or be embedded within them during manufacture. The pairing of cleat magnets (in different vertical planes) with pedal frame magnets (in correspondingly different vertical planes) allows magnetic forces of attraction to guide and aid in the attachment of the cleat to the pedal, particularly in pulling the cleat into the desired position in the horizontally positioned pedal frame. The benefit of having magnets on both sides of the spindle axis is increased rotational stability—the pedal frame would tend to rotate too easily about the spindle axis out of the desired horizontal position if there were one or more magnets on just one side of that axis. The perspective views in FIGS. 5 and 6 show the forward-of-axis and backward-of-axis magnet positions that cannot be easily shown in the end view representation of FIG. 1.

In some embodiments, magnets 192 and 196 may be rare earth magnets, which have particularly attractive ratios of magnetic strength to weight. Some (but not all) of magnets 192 and 196 may be replaced by non-permanent ferromagnetic materials (any metal mixtures, for example, or materials containing iron, nickel, cobalt or lodestone) in the few cases where the potential reduced weight and cost of these materials might warrant either the resulting lower magnetic attraction forces, or the correspondingly increased weight and cost of the remaining magnets required to provide equivalent magnetic attraction forces.

In other embodiments, magnets 192 and 196 may be removed altogether and surfaces 190A and 190B merged into a single vertical surface on the left (inner) side of pedal frame 150. Correspondingly, surfaces 135A and 135B would be merged into a single vertical surface. These embodiments would rely on mechanical friction alone between surfaces 135A/B and 190A/B to hold cleat 110 in place inside pedal frame 150 when a vertical (perpendicular to the spindle axis) force is applied to cleat 110.

In the embodiment shown in FIG. 1, two magnets 196 are seen to be present in pedal frame 150 in the same vertical plane, one above the horizontal plane of the pedal through the spindle axis and one below. In other embodiments, a single magnet may extend from the upper side of pedal frame 150 to the lower side. There would still preferably be at least two such magnets, one forwards of the spindle axis and one backwards of that axis, for rotational stability of the pedal, as discussed above.

The polarity of the various magnets should of course be chosen to achieve attractive forces between cleat and pedal frame. By orienting the pedal frame magnets on either side of the spindle axis with opposing polarities, and correspondingly orienting the polarities of the magnets in the cleat, full dual-side operation of the system (when the pedal is turned upside down) may be maintained.

Figure 2:
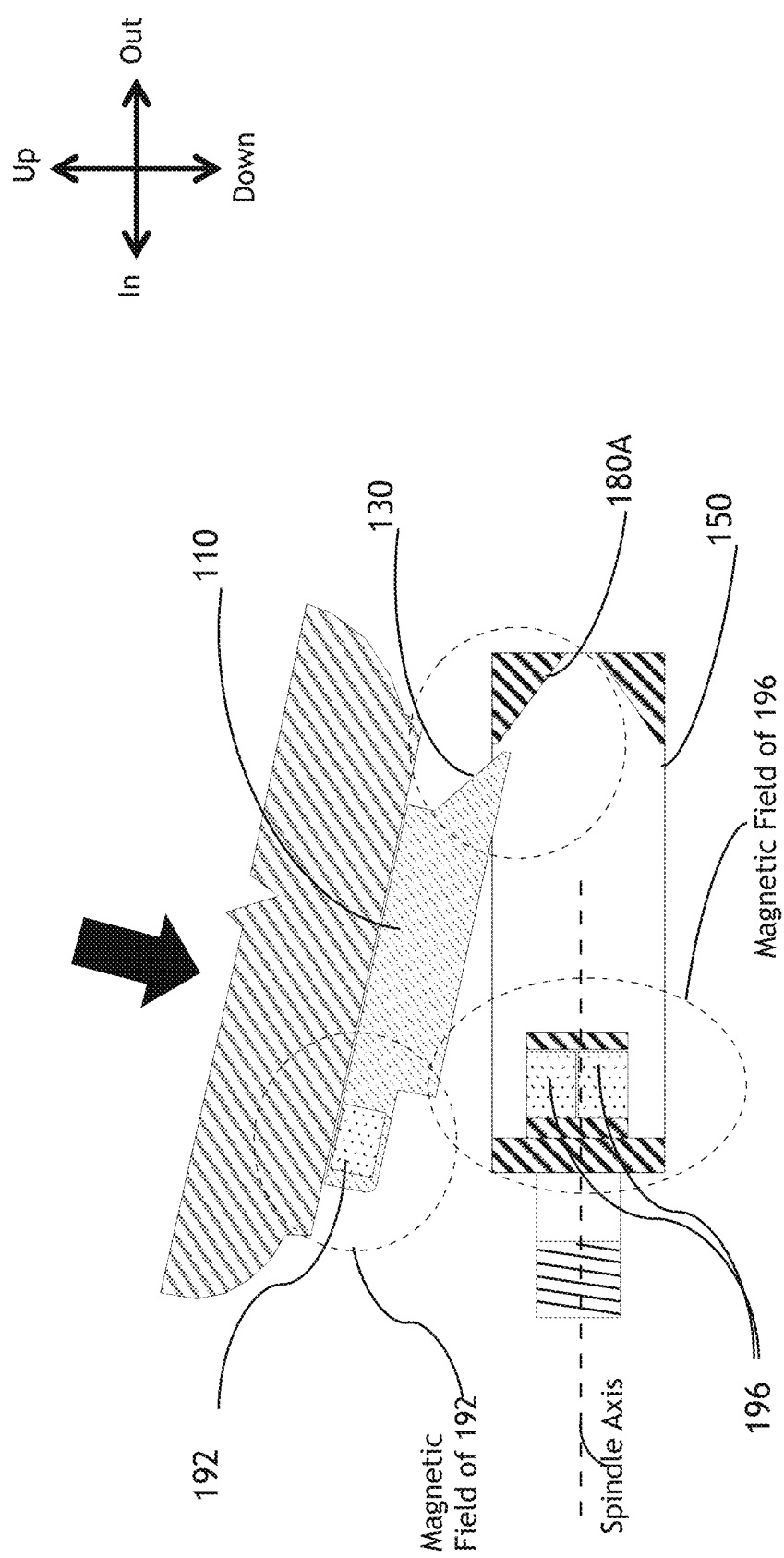
FIG. 2 shows a cross sectional view illustrating an attachment method for a cleat-pedal system according to one embodiment.

FIG. 2 is a cross-sectional view illustrating an attachment method for a cleat-pedal system according to one embodiment, in which the user tilts cleat 110 about a horizontal axis which is itself perpendicular to the spindle axis (and perpendicular to the place of the drawing). The user also moves cleat 110 towards pedal frame 150 along a downwards and typically slightly inwards direction, as indicated by the bold arrow. At the instant shown, cleat 110 has reached a position where the lowest part of surface 130 is just below and to the inwards side of surface 180A. With surfaces 130 and 180A in contact or near to contact, the cleat can subsequently easily be made to slide down and to the right, and pivoted about the horizontal axis mentioned above to release the tilt until the cleat in the "locked" or attached position, where substantially all of surface 130 is in direct contact with surface 180A, and the base of the cleat is horizontal. This locked position may be achieved quite easily even in embodiments lacking magnets 192 and 196, as the shapes of the cleat and the pedal frame, and in particular the relative angular orientations of surfaces 130, 180A etc are chosen so that the only motions required of the user are ones that come naturally and comfortably. However, in embodiments where magnets 192 and 196 are present, the process is even faster, simpler, and more precise, because once the effective magnetic fields (indicated by the dashed ovals in FIG. 2) of the cleat magnets and the pedal frame magnets overlap as shown, magnetic forces engage and guide the cleat downwards and laterally, into the desired locked position. This means that the user does not have to exert great care and control; as soon as the tilted cleat is close enough for the fields to overlap adequately, an "automatic guidance" system effectively takes over, and the cleat simply "clicks" or locks into place. The magnetic attractive forces then act in combination with the mechanical surface forces described above, helping to maintain cleat 110 in the desired locked position during normal pedaling. As long as the cleat is pulled only in a direction perpendicular to the spindle axis, which would be the case in normal pedaling, it will remain locked in place to the pedal.

Figure 3:
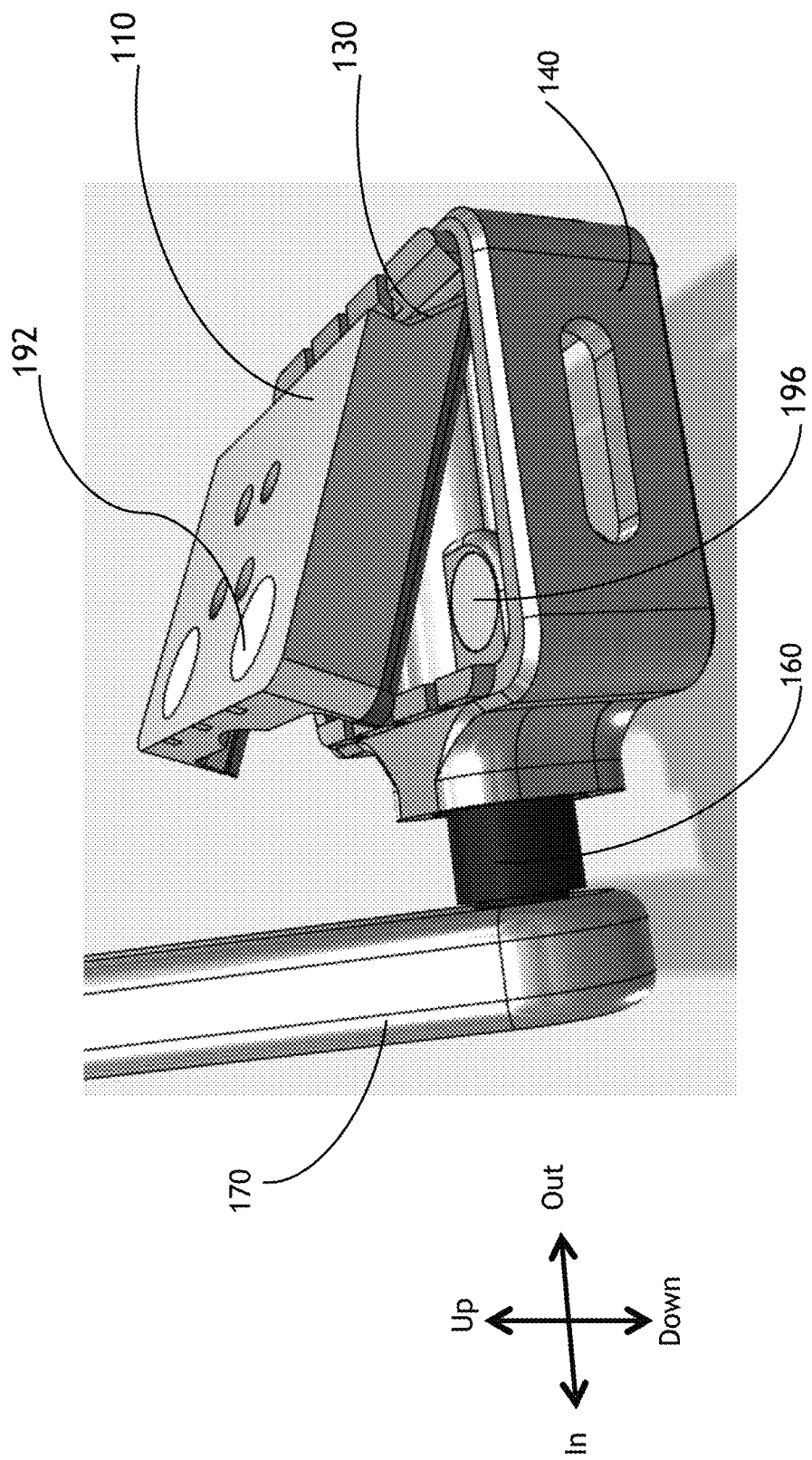
FIG. 3 shows perspective views illustrating an attachment method for a cleat-pedal system according to one embodiment.
Figure 4:
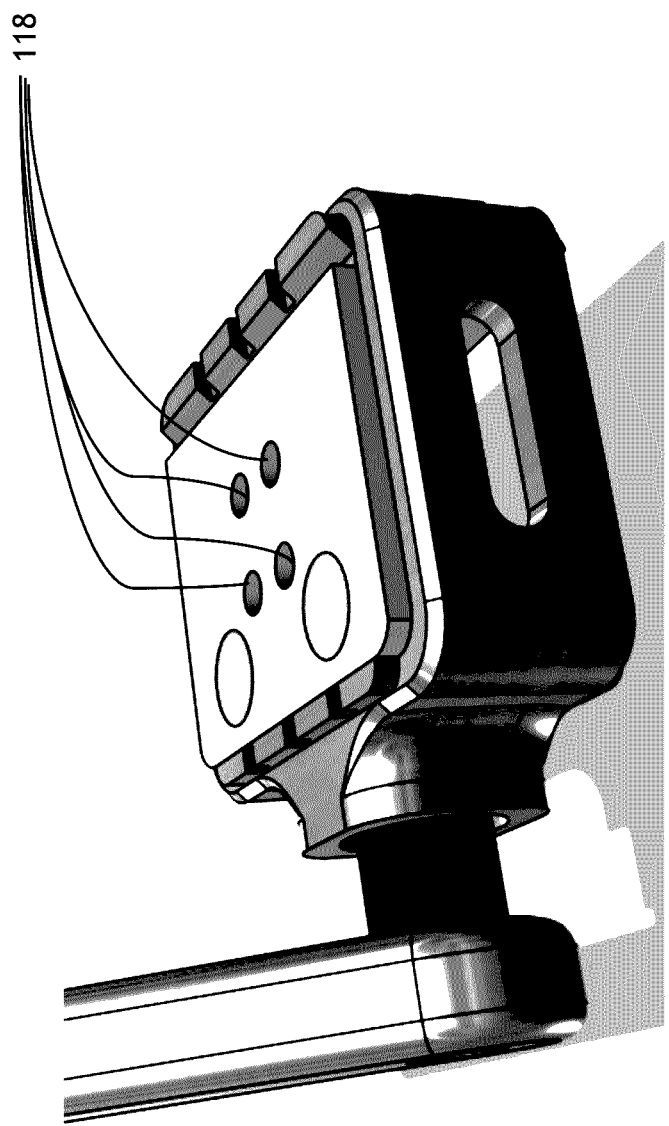
FIG. 4 shows a perspective view of the cleat-pedal attachment embodiment of FIG. 3 in the attached or fully engaged state.

FIG. 3 is a perspective view showing the position of cleat 110 relative to pedal frame 140 and other relevant elements of the cleat-pedal system and bicycle during the process of engagement. FIG. 4 is a corresponding perspective view showing the relative positions once the cleat has been fully engaged, lying flat within pedal frame 160. Mounting holes 118 are indicated in this figure (as one well-known means of attaching cleats to the user's shoes uses screws that require such holes) and corresponding sets of holes in the soles of the user's shoes. In practice, of course, the attachment of shoe to cleat would be carried out prior to the cleat to pedal attachment, but the shoe is omitted from FIGS. 3-5 for simplicity.

FIG. 5 shows exploded views from above and below of the same elements shown in FIG. 3. It may be seen from these two figures that a significant fraction of the volume occupied by the pedal frame is actually empty space. Pedal frame 150 must include the surfaces required to provide the horizontal restraining forces at the outer and inner edges, and must accommodate an attachment port for spindle 160. In some cases, it must also accommodate magnets 196. The remaining pedal frame volume—typically the majority of the volume occupied by the pedal frame—is simple empty space. This results in a low weight system, especially when magnets of high strength-to-weight ratios are used. The compact size and weight of the resulting pedal frame compare very favorably to currently available pedal frames that include elements such as latches, springs etc. The absence of such bulky, moving parts, which are also subject to failure due to wear and tear, is a particular advantage of the present invention. The open design is also helpful in allowing mud and other materials encountered during pedaling to fall through or be easily washed away, and in allowing fast drying to occur after exposure to water.

Standard, cost-effective material choices for the material of spindle 160 include steel and Chromoly, but titanium (lighter but more costly) and Iron are among other options. A good criterion for material choice for the pedal frame is high strength-to-weight ratio. Anodized aluminum satisfies this requirement, and has the additional advantage (for embodiments where magnets are used) of being non-magnetic. Other good non-magnetic choices include titanium, carbon fiber, Kevlar, magnesium or a strong plastic composite material.

The simple structure of cleat 110, particularly the absence of any moving parts, lends itself to the addition of layer 115, shown in FIG. 5, covering the base of cleat 210. Layer 115 is composed of a material with good outer surface grip or "non-slip" qualities. The presence of layer 115 does not affect the functionality of surfaces 130, 135A and 135B, or significantly reduce the effective field strength of magnet 192. This non-slip layer may be sufficiently thick and compressible to allow the bicyclist to walk as well as pedal while wearing the shoe-cleat assembly, with more comfort than is provided by currently available cleat designs. One good set of material choices in this regard is a plastic composite for the bulk of the cleat (i.e. the part excluding any magnets) with a rubber layer 115 added to the base. Alternatively, the entire cleat may also be constructed of material with a relatively good balance of tensile strength, flexibility, and grip for simplicity while sacrificing some advantages of a more rigid material for the cleat.

FIG. 6 is a cross-sectional view illustrating a detachment method for a cleat-pedal system according to one embodiment, in which the user tilts cleat 110 (firmly secured to shoe 120) about a horizontal axis which is itself perpendicular to the spindle axis (and perpendicular to the place of the drawing). The user also moves cleat 110 away from pedal frame 150 along an upwards and typically slightly outwards direction, as indicated by the bold arrow. At the instant shown, cleat 110 has reached a position where surface 130 has begun to lose contact with the inwards side of surface 180A, and the inner edges of cleat 110 have been lifted away from making good contact with the corresponding vertical inner surfaces of cleat frame 150. The shapes of the cleat and the pedal frame, and in particular the relative angular orientations of surfaces 130 etc are chosen so that the required magnitudes of tilt and lift are small and easily accomplished, again requiring only motions that that come naturally and comfortably to the human user.

In embodiments like the one shown in FIG. 6, where magnets are present, the strength of the magnets is chosen so that the lifting force required to overcome the magnetic forces of attraction is easily exerted by the user.

In all embodiments, the combination of tilting and lifting, the two actions occurring substantially simultaneously, allows the cleat to move up and out, quickly pulling free of the pedal frame. This detachment is achieved much more easily than with currently available cleat-pedal systems, which either require the user to rotate or twist the cleat in a horizontal plane, or to pull vertically up with great force. The ease of detachment is particularly beneficial in situations where a very quick "exit" is necessary for safety, for example during or immediately after a fall. In this disclosure, the term "substantially vertical" is used to mean vertical or close to (within about 10 degrees of) vertical. Similarly, the term "substantially simultaneously" is used to mean simultaneously or close to simultaneously (within about 10 seconds), and "substantially perpendicular" is used to mean within about 10 degrees of perpendicular.

Embodiments described herein provide various benefits to cyclists. In particular, embodiments allow for quick and convenient cleat-pedal attachment and detachment, using systems and methods which maintain the shoe firmly in position during normal pedaling while placing relatively low demands on the cyclist in terms of force, precision of placement, and awkwardness of motion required. No moving parts are required. Some embodiments provide a cleat with a comfortable non-slip "sole", allowing the user to walk with relative ease on solid ground while wearing the shoe-attached cleat.

The above-described embodiments should be considered as examples of the present invention, rather than as limiting the scope of the invention. Various modifications of the above-described embodiments of the present invention will become apparent to those skilled in the art from the foregoing description and accompanying drawings. Accordingly, the present invention is to be limited solely by the scope of the following claims.

The invention claimed is:

1. A cleat-pedal attachment system, the system comprising:
 a cleat comprising a first surface, a second surface, and a downward facing base surface; and
 a pedal comprising:
  a spindle configured to reversibly attach to a crank arm of a bicycle characterized by a central vertical plane; and
  a pedal frame comprising:
   a third surface positioned near the side of the pedal frame furthest from the central vertical plane when the spindle is attached to the crank arm; and a fourth surface, substantially perpendicular to the spindle axis, positioned near the side of the pedal frame closest to the central vertical plane when the spindle is attached to the crank arm;
  wherein the first surface of the cleat meets the base surface at a first acute angle to form a protrusion extending horizontally outwards, the second surface of the cleat meeting the base surface at a second angle of approximately 90 degrees; and
  wherein the third surface of the pedal frame faces downwards and towards the central vertical plane when the spindle is attached to the crank arm, at an angle with respect to the horizontal spindle axis that is equal to the first angle, the fourth surface of the pedal frame facing away from the central vertical plane towards the third surface.

2. The system of claim 1 additionally comprising a first plurality of magnets attached to or embedded within the cleat and a corresponding second plurality of magnets attached to or embedded within the pedal frame.

3. The system of claim 2 wherein at least one of the first plurality of magnets and the second plurality of magnets comprises rare-earth magnets.

4. The system of claim 2 wherein the pedal frame consists of non-magnetic material.

5. The system of claim 1 wherein the base surface of the cleat comprises a material having non-slip characteristics.

6. The system of claim 5 wherein the material comprises rubber.

7. The system of claim 1 wherein friction acts to hold the second surface of the cleat in place against the fourth surface of the pedal frame.

8. A method for a user wearing a cleat to engage the cleat into a substantially horizontal pedal frame attached to a crank arm of a bicycle characterized by a central vertical plane by a spindle, and to maintain the cleat in an engaged position in the pedal frame, the method comprising:
 tilting the cleat about a horizontal axis perpendicular to the axis of the spindle, wherein the cleat comprises first and second surfaces, the first surface being shaped to conform to a third surface of the pedal frame, the third surface being positioned near the side of the pedal frame furthest from the central vertical plane;
 positioning the tilted cleat such that the first surface of the cleat closely approaches the third surface of the pedal frame; and
 releasing the tilt, allowing the cleat to fit into the pedal frame such that the first and third surfaces are in direct contact, and such that a second surface of the cleat is in direct contact with a fourth surface of the pedal frame, substantially perpendicular to the spindle axis, and positioned near the side of the pedal frame closest to the central vertical plane;
 wherein, during normal pedaling, the first surface is oriented to face upwards and outwards from the central vertical plane, and the third surface is oriented to face downwards and towards the central vertical plane, so that in response to the user lifting the cleat vertically in an upwards direction away from the pedal frame, the first surface of the cleat exerts a force with a vertical component against the third surface of the pedal frame, in turn causing the transmission of a force with a horizontal component through the cleat such that the second surface of the cleat exerts a horizontal force against the fourth surface of the pedal frame, maintaining the cleat in the engaged position in the pedal frame.

9. The method of claim 8 wherein the cleat additionally comprises a first plurality of magnets and wherein the pedal frame additionally comprises a corresponding second plurality of magnets.

10. The method of claim 9 wherein at least one of the first plurality of magnets and the second plurality of magnets comprises rare-earth magnets.

11. The method of claim 10 wherein the pedal frame consists of non-magnetic material.

12. The method of claim 8 wherein the cleat additionally comprises an outer layer of a material having non-slip characteristics.

13. The method of claim 12 wherein the material comprises rubber.

14. The method of claim 8 wherein the horizontal force comprises friction.

15. A method of disengaging a cleat from a substantially horizontal pedal frame attached to a crank arm of a bicycle characterized by a central vertical plane by a spindle, the method comprising:
 tilting the cleat about a horizontal axis perpendicular to the axis of the spindle, wherein the cleat comprises first and second surfaces, the first surface being shaped to conform to a third surface of the pedal frame, the third surface being positioned near the side of the pedal frame furthest from the central vertical plane and being oriented to face downwards and towards the central vertical plane when the cleat is engaged in a normal pedaling position; and
 lifting the cleat such that a second surface of the cleat previously positioned against a fourth surface of the pedal frame near the side of the pedal frame closest to the central vertical plane moves vertically out of contact with the fourth surface;
 wherein the tilting and the lifting occur substantially simultaneously.

16. The method of claim 15 wherein the cleat additionally comprises a first plurality of magnets, wherein the pedal frame additionally comprises a corresponding second plurality of magnets, and wherein the tilting and the lifting overcome the magnetic attraction forces between the first and second plurality of magnets.

* * * * *